April 9, 1929.     F. D. PEARNE     1,708,737
SELECTIVE RELAY
Filed July 16, 1926
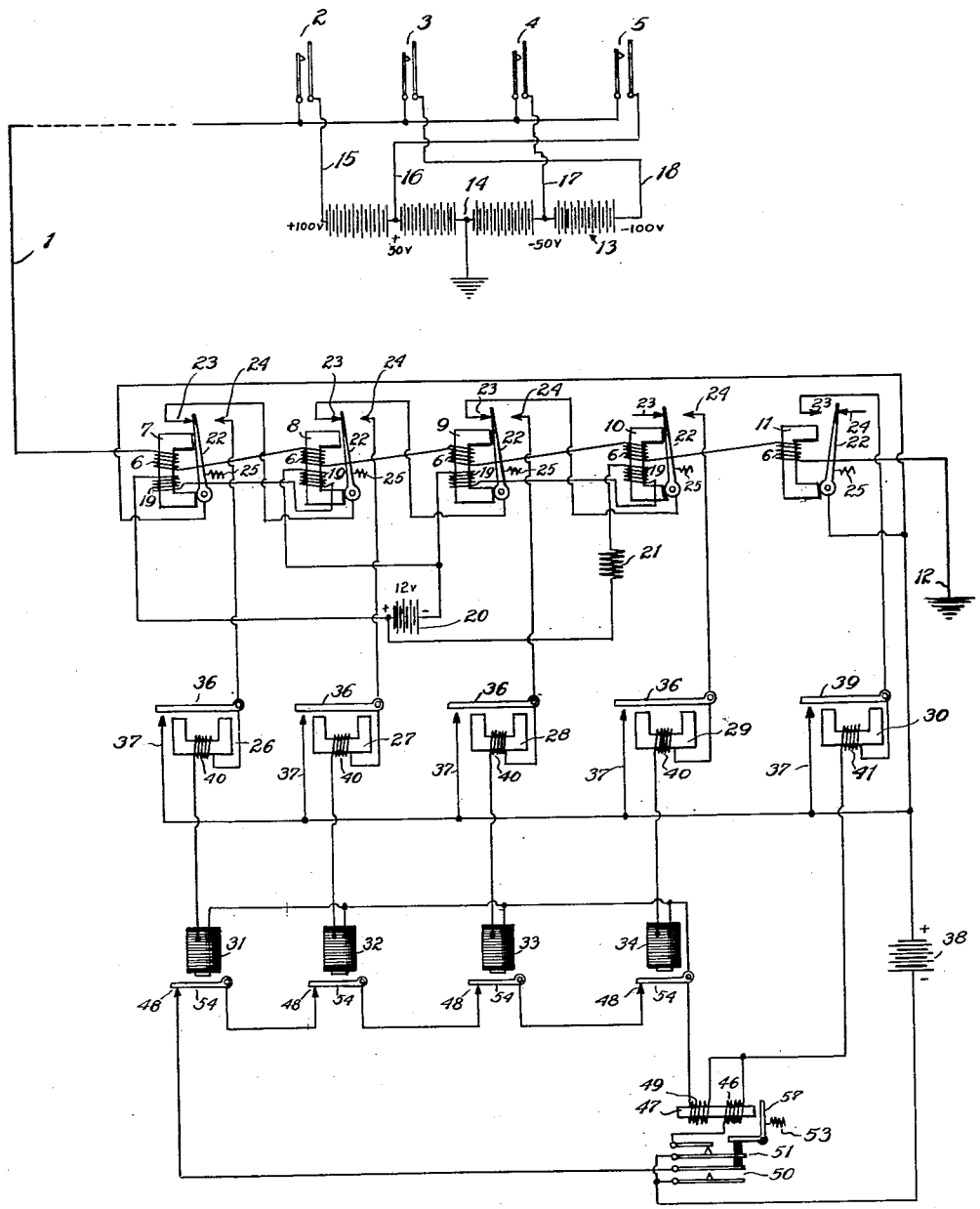
Witness
John C. Titus
Inventor
Frank D. Pearne
Rummler & Rummler, Attys Patented Apr. 9, 1929.

1,708,737

UNITED STATES PATENT OFFICE.

FRANK D. PEARNE, OF CHICAGO, ILLINOIS, ASSIGNOR, BY MESNE ASSIGNMENTS, TO WIRE TRANSMITTING CORPORATION, OF CHICAGO, ILLINOIS, A CORPORATION OF DELAWARE.

SELECTIVE RELAY.

Application filed July 16, 1926. Serial No. 122,913.

This invention relates to improvements in electrical telegraphs and the like, wherein more than two relays may be selectively operated from a single line circuit.

This invention relates particularly to the selective relay system of a typewriter telegraph such as shown in application Serial No. 122,915 filed July 16, 1926, by the present applicant and another. In this application, the circuits have been simplified, and electrically operated switches have been substituted for certain of the mechanically operated switches in order to disclose the principal of this invention without the necessity of showing and describing the complicated typewriter mechanism.

The main objects of this invention are to provide a quick-acting relay mechanism for selectively operating one of a plurality of devices, such as the printing magnets in the application referred to above, subsequent to an immediately preceding starting signal which, in said application, starts the mechanical selector and distributor into operation; and to provide such a device in which a high rate of signaling may be attained, and which is positively cleared or restored to normal at the completion of the desired operation, such as the printing of the selected character.

An embodiment of this invention is shown in the accompanying drawing, which shows an electrical diagram of an illustrative electrical system.

Referring to the drawing, the line 1 is connected from one terminal of the remote control switches 2, 3, 4 and 5, through the line windings 6 of the line relays 7, 8, 9, 10 and 11, in series, to a ground connection 12.

The sending energy may be supplied by a generator or battery 13 shown in the drawings, comprising a plurality of electrolytic cells connected in series and grounded at the center 14, so that current may be sent in either direction. The terminal 15, preferably at plus 100 volts, is connected to switch 2; the terminal 16, plus 50, is connected to the switch 5, the terminal 17, minus 50, to switch 4; and the terminal 18, minus 100, is connected to the switch 3. Then by closing the switch 2, a positive 100 volt impulse is sent through the line circuit. The second switch 3 causes a positive 50 volt impulse; the switch 4 a negative 50 volt impulse, and the switch 5 a negative 100 volt impulse.

The first four line magnets 7, 8, 9 and 10 are provided with holding windings 19, which are wound oppositely in each succeeding magnet. The positive terminal of the local battery 20, is connected through the windings 19 of the line magnets 7 and 8 back to the negative terminal. The windings 19 of the magnets 9 and 10 are similarly connected across the battery 20, except that a resistance 21 is inserted to reduce the voltage across the holding windings of the two latter line magnets. The armatures 22 of the line magnets are pivotally mounted to swing between the contact points 23 and 24, and the armatures are urged away from the attraction of the corresponding magnets by means of the springs 25.

In this manner, the first line magnet is energized to attract its armature and requires an impulse from the first line switch 2 to de-energize the magnet, so that the armature may be released to be swung against the outer contact 24 by the spring 25. The second line magnet 8 requires an equal and opposite impulse from the second line switch 3. The two remaining line magnets 9 and 10 are de-energized by impulses from the plus 50 and the negative 50 terminals respectively, connected through the line or sending switches 4 and 5.

The two magnets 7 and 9 are each energized, as described, at the same polarity, but at different intensities. The energization of the magnet 7 may be represented as a minus 100, and the magnet 9 as a minus 50. When a plus 100 impulse is given over the line, the current of course rises from a zero value to the plus 100, which is equal in opposite to the minus 100, and de-energizes the magnet 7, but does not de-energize the magnet 9, so that the spring 25 may pull the armature 22 away. Apparently the flux in the opposite direction is built up before the flux in the core dies out, so that in this case there is always a field present for holding the armature attracted, since the attraction of the armature is not dependent upon the polarity, that is, the armature is attracted in the same direction toward the pole by either field polarity.

The same relation exists between the magnet 8 and the magnet 10. If the current rises to minus 50 and stops, or is momentarily stationary at that value, the last line magnet 10 is de-energized, but, if the current rises to minus 100 the second line magnet 8 would be de-energized, the remaining magnets not being effected.

Commonly this system is used with a starting line magnet 11, which has no holding winding and responds to any impulse on the line; and the lock-up relays 26, 27, 28, 29 and 30 and the printing magnets 31, 32, 33, 34 are shown to illustrate a preferred manner of utilizing the selective relays.

The armatures 36 of the first four lock-up relays, 26, 27, 28 and 29 are each connected to the outer contact 24 of the first four line magnets respectively. The contact point 37 of all of the lock-up relays is connected to the positive terminal of the local power battery 38. The armature 39 of the fifth lock-up relay 30 is connected to the inner contact 23 of the neutral line magnet 11. The windings 40 of the first four lock-up relays are connected respectively to one terminal of the printing magnets 31, 32, 33 and 34. The winding 41 of the fifth lock-up magnet is connected to the energizing coil 46 and the holding coil 49 of the switch operating relay 47. The negative terminals of the printing magnets are connected together and connected through the series of normally closed switches 48 to the normally open switch 50, which is also connected to the negative terminal of the battery 38. The negative terminal of the energizing coil 46 is connected to the normally closed switch 51, which also connects to the negative terminal of the battery 38; and the holding coil 49 is connected through the series of switches 48 to the switch 50.

The positive terminal of the battery 38 is connected to the armature 22 of the magnet 11, and also to the armature 22 of the first line magnet 7. The inner contact 23 of the first line magnet is connected to the armature of the succeeding magnet, which is connected through the corresponding inner contact to the next succeeding armature, and so on to the armature of the fourth line magnet, where the connection ends since the inner contact point 23 of the fourth magnet is not used electrically.

When the relay 47 is energized by the winding 46, the armature 52 is attracted against the force of the spring 53. This opens the switch 51 and closes the switch 50. Also when any of the printing magnets are energized the corresponding armature 54 is attracted and breaks the corresponding switch 48.

The first impulse, preferably plus 50, is sent through the line to energize the starting magnet 11 and is otherwise ineffective as long as the switch 50 is open. Energizing magnet 11 closes the circuit from the local battery 38 through the corresponding armature 22, which is then attracted into contact with the inner point 23, through the winding 41 of the lock-up relay 30, through the winding 46 of the relay 47, through the closed switch 51 back to the battery. This locks up the armature 39 against the contact point 37, which duplicates the connection made by the armature lever 22, so that it is immaterial whether the lever of the line magnet remains energized for any definite length of time. This operation closes the switch 50 and opens the circuit through the switch 51.

When the switch 50 is closed the first four line units are in condition for effective operation. Then the second impulse is sent for selecting and operating any one of the first four magnets, the deenergizing of which causes the corresponding lock-up relay to operate to close the circuit through the corresponding printing magnet, and causes its operation. When the printing magnet has fully operated the circuit is broken by the switch 48. This breaks the circuit through the holding coil 47 as well as the return circuit of all the printing magnets and the system is restored to normal.

By using the two coils 6 and 19 and energizing the holding coil 19 from a current source, the intensity of the energization of the magnet may be controlled at a predetermined value so that several relays at the same polarity can be selectively operated on a single line. Also the speed of action is increased because the armature springs 25 may be quite strong, and less delicate adjustments are required.

Although but one specific embodiment of this invention has been herein shown and described, it will be understood that numerout details of the construction shown may be altered or omitted without departing from the spirit of this invention as defined by the following claims.

I claim:

1. In a telegraph, a printing magnet, a local battery, a neutral line relay and a cooperative locking relay for connecting one terminal of the magnet to the battery, a selective line relay and a cooperative locking relay for connecting the opposite terminal to the battery, and a switch operated by the battery for restoring said elements to normal condition.

2. In a telegraph, a printing magnet, a selective line relay normally ineffective for operating the printing magnet, a neutral line relay in series with the selective relay for rendering the selective relay effective for operating the magnet, and a switch operated by the printing magnet for restoring said elements to normal condition.

3. In a telegraph, a line, a plurality of printing magnets, a selective polarized line relay normally ineffective for energizing each magnet, a neutral line relay for rendering the polarized relays effective on their respective magnets, and a switch operated by each of the magnets when energized for restoring said elements to normal condition.

4. In a telegraph, a plurality of printing magnets, a local battery normally ineffective for energizing the magnets, a neutral line relay for locking one side of the local battery to the magnets, a selective polarized relay for each of the printing magnets for connecting the opposite side of the battery to the respective magnets, and a switch related with each magnet and operated thereby when the magnet is energized for breaking said connections to the battery.

Signed at Chicago this 14th day of July, 1926.

FRANK D. PEARNE.